United States Patent
Li et al.

(10) Patent No.: US 11,694,341 B2
(45) Date of Patent: Jul. 4, 2023

(54) CASCADED ARCHITECTURE FOR DISPARITY AND MOTION PREDICTION WITH BLOCK MATCHING AND CONVOLUTIONAL NEURAL NETWORK (CNN)

(71) Applicant: TEXAS INSTRUMENTS INCORPORATED, Dallas, TX (US)

(72) Inventors: Jing Li, Richardson, TX (US);
Do-Kyoung Kwon, Allen, TX (US);
Tarek Aziz Lahlou, Plano, TX (US)

(73) Assignee: Texas Instmments Incorporated, Dallas, TX (US)

( * ) Notice: Subject to any disclaimer, the term of this patent is extended or adjusted under 35 U.S.C. 154(b) by 411 days.

(21) Appl. No.: 16/725,296

(22) Filed: Dec. 23, 2019

(65) Prior Publication Data
US 2021/0192752 A1   Jun. 24, 2021

(51) Int. Cl.
*G06T 7/223*   (2017.01)
*G06T 7/285*   (2017.01)
(Continued)

(52) U.S. Cl.
CPC .............. *G06T 7/223* (2017.01); *G06N 3/02* (2013.01); *G06T 7/285* (2017.01); *H04N 13/106* (2018.05);
(Continued)

(58) Field of Classification Search
USPC .................. 382/107, 154, 294, 156; 345/419
See application file for complete search history.

(56) References Cited

U.S. PATENT DOCUMENTS 7,120,276 B1 * 10/2006 Brady ................. G06V 10/754
382/294
8,094,927 B2 * 1/2012 Jin ......................... G06T 15/10
348/42
(Continued)

FOREIGN PATENT DOCUMENTS

WO   WO2019/109336 A1   6/2019

OTHER PUBLICATIONS

A. Geiger et al. "Are we ready for autonomous driving? the KITTI vision benchmark suite." IEEE 2012 IEEE Conference on Computer Vision and Pattern Recognition (CVPR), Jun. 18-20, 2012, p. 3354-3361.
(Continued)

*Primary Examiner* — Kathleen Y Dulaney
(74) *Attorney, Agent, or Firm* — Michael T. Gabrik; Frank D Cimino

(57) ABSTRACT

A CNN operates on the disparity or motion outputs of a block matching hardware module, such as a DMPAC module, to produce refined disparity or motion streams which improve operations in images having ambiguous regions. As the block matching hardware module provides most of the processing, the CNN can be small and thus able to operate in real time, in contrast to CNNs which are performing all of the processing. In one example, the CNN operation is performed only if the block hardware module output confidence level is below a predetermined amount. The CNN can have a number of different configurations and still be sufficiently small to operate in real time on conventional platforms.

20 Claims, 14 Drawing Sheets
(3 of 14 Drawing Sheet(s) Filed in Color)

(51) Int. Cl.
*H04N 13/106* (2018.01)
*G06N 3/02* (2006.01)
*H04N 13/00* (2018.01)

(52) U.S. Cl.
CPC .............. *G06T 2207/10021* (2013.01); *G06T 2207/20084* (2013.01); *H04N 2013/0081* (2013.01); *H04N 2013/0085* (2013.01)

(56) References Cited

U.S. PATENT DOCUMENTS

| | | | |
|---|---|---|---|
| 9,760,837 B1* | 9/2017 | Nowozin | G01S 7/4808 |
| 10,268,901 B2 | 4/2019 | Garud et al. | |
| 10,380,753 B1* | 8/2019 | Csordás | G06V 10/82 |
| 10,467,768 B2* | 11/2019 | Xu | G06K 9/627 |
| 10,808,007 B2 | 10/2020 | Nicolaou et al. | |
| 2008/0037848 A1* | 2/2008 | Xu | G06T 7/0012 382/131 |
| 2013/0156278 A1 | 6/2013 | Kim et al. | |
| 2016/0227237 A1 | 8/2016 | Kwon et al. | |
| 2017/0353708 A1* | 12/2017 | Petrichkovich | G06T 7/97 |
| 2018/0181816 A1 | 6/2018 | Garud et al. | |
| 2018/0255283 A1* | 9/2018 | Li | G06V 10/774 |
| 2019/0073740 A1 | 3/2019 | Garud et al. | |
| 2019/0108613 A1* | 4/2019 | Hotson | G06T 7/0008 |
| 2019/0156502 A1* | 5/2019 | Lee | G06N 3/08 |
| 2019/0377953 A1* | 12/2019 | Chatterji | G06V 20/41 |
| 2020/0084427 A1* | 3/2020 | Sun | G06N 3/0454 |
| 2020/0211206 A1* | 7/2020 | Wang | G06V 10/92 |
| 2020/0273192 A1* | 8/2020 | Cheng | G06T 7/593 |
| 2020/0302629 A1* | 9/2020 | Jie | G06V 10/462 |
| 2020/0401871 A1* | 12/2020 | Tseng | G06N 3/082 |
| 2021/0012126 A1* | 1/2021 | Porta | G06K 9/6288 |
| 2021/0127204 A1* | 4/2021 | Porta | G06V 40/166 |
| 2021/0142055 A1* | 5/2021 | Broggi | G08G 1/01 |

OTHER PUBLICATIONS

D. Kingma et al. "Adam: A Method for Stochastic Optimization." 3rd International Conference for Learning Representations, San Diego, 2015, p. 1-15.

N. Mayer et al. "A large dataset to train convolutional networks for disparity, optical flow, and scene flow estimation." IEEE 2016 IEEE Conference on Computer Vision and Pattern Recognition (CVPR), Jun. 27-30, 2016, p. 4040-4048.

A. Gaidon et al. "Virtual worlds as proxy for multi-object tracking analysis." IEEE 2016 IEEE Conference on Computer Vision and Pattern Recognition (CVPR), Jun. 27-30, 2016, p. 4340-4349.

S. Gidaris et al. "Detect, replace, refine: Deep structured prediction for pixel wise labeling." IEEE 2017 IEEE Conference on Computer Vision and Pattern Recognition (CVPR), Jul. 21-26, 2017, p. 7187-7196.

J. Pang et al. "Cascade Residual Learning: A Two-Stage Convolutional Neural Network for Stereo Matching." IEEE 2017 IEEE International Conference on Computer Vision Workshop (ICCVW), Oct. 22-29, 2017, p. 878-886.

J. Pang et al. "Supplemental Material for Cascade Residual Learning: A Two-Stage Convolutional Neural Network for Stereo Matching." IEEE 2017 IEEE International Conference on Computer Vision Workshops, Oct. 22-29, 2017.

Liang-Chieh Chen, et al. "Encoder-decoder with atrous separable convolution for semantic image segmentation." Proceedings of the European Conference on Computer Vision (ECCV), Sep. 11, 2018, p. 1-18.

M. Sandler et al. "MobileNetV2: Inverted Residuals and Linear Bottlenecks." IEEE 2018 IEEE/CVF Conference on Computer Vision and Pattern Recognition, Jun. 1, 2018, p. 4510-4520.

Z. Lin et al. "Empowering Automotive Vision with TI's Vision AccelerationPac." Texas Instruments White Paper, Oct. 2013, p. 1-8.

A. Dubey. "Stereo Vision-Facing the Challenges and Seeing the Opportunities for ADAS Applications." Texas Instruments, SPRY300, Jul. 2016, p. 1-15.

T. Chen et al. "Monocular Dense Reconstruction by Depth Estimation Fusion." IEEE 2018 Chinese Control and Decision Conference, Jun. 9-11, 2018.

H. Hirschmuller, "Accurate and Efficient Stereo Processing by Semi-Global Matching and Mutual Information," IEEE Computer Science Conference on Computer Vision and Pattern Recognition, vol. 2, Jun. 20-25, 2005, pp. 807-814.

H. Hirschmuller, "Stereo Processing by Semi-Global Matching and Mutual Information," IEEE Transactions on Pattern Analysis and Machine Intelligence, vol. 30, No. 2, Feb. 2008, pp. 328-341.

B. Lucas, & T. Kanade, "An Iterative Image Registration Technique with an Application to Stereo Vision," Proceedings of the 7th International Joint Conference on Artificial Intelligence, 1981, pp. 121-130.

B. Lucas, "Generalized Image Matching by the Method of Differences," Carnegie-Mellon University, Department of Computer Science, 1984.

PCT International Search Report; PCT/US 2020/066317; dated Mar. 25, 2021, 2 pages.

Mayer Nikolaus et al. A Large Dataset to Train Convolutional Networks for Disparity, Optical Flow, and Scene Flow Estimation. Computer Vision and Pattern Recognition (cs.CV), 2016 DOI: 10.1109/CVPR.2016.438, sections 3, 4, 5.

\* cited by examiner

CASCADED ARCHITECTURE FOR MOTION ESTIMATION

RESIDUAL MODULE

| | LAYER | K | R | E | S | CHANNELS | I | O | INPUT CHANNELS |
|---|---|---|---|---|---|---|---|---|---|
| 704 | CONV1 | 3 | -- | -- | 2 | 13(14)/32 | 1 | 2 | IMAGES & DMPAC OUTPUT |
| 706 | DWISE1 | 3 | -- | -- | 1 | 32/32 | 2 | 2 | CONV1 |
| 708 | CONV2 | 1 | -- | -- | 1 | 32/16 | 2 | 2 | DWISE1 |
| 710 | BLOCK1 | -- | 1 | 6 | 2 | 16/24 | 2 | 4 | CONV1 + CONV2 |
| 712 | BLOCK1_1 | -- | 1 | 6 | 1 | 24/24 | 4 | 4 | BLOCK1 |
| 714 | BLOCK2 | -- | 1 | 6 | 2 | 24/32 | 4 | 8 | BLOCK1_1 |
| 716 | BLOCK2_1 | -- | 1 | 6 | 1 | 32/32 | 8 | 8 | BLOCK2 |
| 718 | BLOCK2_2 | -- | 1 | 6 | 1 | 32/32 | 8 | 8 | BLOCK2_1 |
| 720 | BLOCK3 | -- | 1 | 6 | 1 | 32/64 | 8 | 8 | BLOCK2_2 |
| 722 | BLOCK3_1 | -- | 2 | 6 | 1 | 64/64 | 8 | 8 | BLOCK3 |
| 724 | BLOCK3_2 | -- | 2 | 6 | 1 | 64/64 | 8 | 8 | BLOCK3_1 |
| 726 | BLOCK3_3 | -- | 2 | 6 | 1 | 64/64 | 8 | 8 | BLOCK3_2 |
| 728 | BLOCK4 | -- | 2 | 6 | 1 | 64/96 | 8 | 8 | BLOCK3 |
| 730 | BLOCK4_1 | -- | 2 | 6 | 1 | 96/96 | 8 | 8 | BLOCK3_1 |
| 732 | BLOCK4_2 | -- | 2 | 6 | 1 | 96/96 | 8 | 8 | BLOCK3_2 |
| 734 | BLOCK5 | -- | 2 | 6 | 1 | 96/160 | 8 | 8 | BLOCK4_2 |
| 736 | BLOCK5_1 | -- | 2 | 6 | 1 | 160/160 | 8 | 8 | BLOCK5 |
| 738 | BLOCK5_2 | -- | 2 | 6 | 1 | 160/160 | 8 | 8 | BLOCK5_1 |
| 740 | BLOCK6 | -- | 2 | 6 | 1 | 160/320 | 8 | 8 | BLOCK5_2 |
| 742 | DWISE2 | 3 | 1 | -- | 1 | 320/256 | 8 | 8 | BLOCK6 |
| 744 | AvrPool | -- | -- | -- | -- | 256/256 | 8 | 8 | DWISE2 |
| 748 | CONV3 | 3 | 1 | -- | 1 | 512/2 | 8 | 8 | DWISE2 + AvrPool |
| 750 | UPSAMPLING | | | | | 2/1(2) | 8 | 1 | CONV3 |

K IS KERNAL SIZE, S MEANS STRIDE, R > 1 MEANS DILATED CONVOLUTION, E MEANS EXPANSION FACTOR, CHANNELS IS NUMBER OF INPUT/OUTPUT CHANNELS, I/O ARE DOWN SAMPLE FACTORS

| | LAYER | K | R | E | S | CHANNELS | I | O | INPUT CHANNELS |
|---|---|---|---|---|---|---|---|---|---|
| 704 | CONV1 | 3 | -- | -- | 2 | 4(5)/32 | 1 | 2 | IMAGE & DMPAC OUTPUT |
| 706 | DWISE1 | 3 | -- | -- | 1 | 32/32 | 2 | 2 | CONV1 |
| 708 | CONV2 | 1 | -- | -- | 1 | 32/16 | 2 | 2 | DWISE1 |
| 710 | BLOCK1 | -- | 1 | 6 | 2 | 16/24 | 2 | 4 | CONV1 + CONV2 |
| 712 | BLOCK1_1 | -- | 1 | 6 | 1 | 24/24 | 4 | 4 | BLOCK1 |
| 714 | BLOCK2 | -- | 1 | 6 | 2 | 24/32 | 4 | 8 | BLOCK1_1 |
| 716 | BLOCK2_1 | -- | 1 | 6 | 1 | 32/32 | 8 | 8 | BLOCK2 |
| 718 | BLOCK2_2 | -- | 1 | 6 | 1 | 32/32 | 8 | 8 | BLOCK2_1 |
| 720 | BLOCK3 | -- | 1 | 6 | 1 | 32/64 | 8 | 8 | BLOCK2_2 |
| 722 | BLOCK3_1 | -- | 2 | 6 | 1 | 64/64 | 8 | 8 | BLOCK3 |
| 724 | BLOCK3_2 | -- | 2 | 6 | 1 | 64/64 | 8 | 8 | BLOCK3_1 |
| 726 | BLOCK3_3 | -- | 2 | 6 | 1 | 64/64 | 8 | 8 | BLOCK3_2 |
| 728 | BLOCK4 | -- | 2 | 6 | 1 | 64/96 | 8 | 8 | BLOCK3 |
| 730 | BLOCK4_1 | -- | 2 | 6 | 1 | 96/96 | 8 | 8 | BLOCK3_1 |
| 732 | BLOCK4_2 | -- | 2 | 6 | 1 | 96/96 | 8 | 8 | BLOCK3_2 |
| 734 | BLOCK5 | -- | 2 | 6 | 1 | 96/160 | 8 | 8 | BLOCK4_2 |
| 736 | BLOCK5_1 | -- | 2 | 6 | 1 | 160/160 | 8 | 8 | BLOCK5 |
| 738 | BLOCK5_2 | -- | 2 | 6 | 1 | 160/160 | 8 | 8 | BLOCK5_1 |
| 740 | BLOCK6 | -- | 2 | 6 | 1 | 160/320 | 8 | 8 | BLOCK5_2 |
| 742 | DWISE2 | 3 | 1 | -- | 1 | 320/256 | 8 | 8 | BLOCK6 |
| 760 | DWISE3 | 3 | 6 | -- | 1 | 320/256 | 8 | 8 | BLOCK6 |
| 762 | DWISE4 | 3 | 12 | -- | 1 | 320/256 | 8 | 8 | BLOCK6 |
| 764 | DWISE5 | 3 | 18 | -- | 1 | 320/256 | 8 | 8 | BLOCK6 |
| 768 | CONV3 | 1 | 1 | -- | 1 | 1024/256 | 8 | 8 | DWISE2 & 3 & 4 & 5 |
| 774 | CONV4 | 1 | 1 | -- | 1 | 24/48 | 4 | 4 | BLOCK1 |
| 770 | UPSAMPLING1 | | | | | 256/256 | 8 | 4 | CONV3 |
| 776 | DWISE6 | 3 | 1 | -- | 1 | 304/304 | 4 | 4 | CONV4 & UPSAMPLING1 |
| 778 | CONV5 | 1 | 1 | -- | 1 | 304/256 | 4 | 4 | DWISE6 |
| 780 | CONV6 | 1 | 1 | -- | 1 | 256/256 | 4 | 4 | CONV5 |
| 782 | CONV7 | 1 | 1 | -- | 1 | 256/1(2) | 4 | 4 | CONV6 |
| 786 | POOLING1 | 4 | -- | -- | 4 | 1(2)/1(2) | 1 | 4 | DMPAC OUTPUT |
| 788 | UPSAMPLING2 | | | | | 1(2)/1(2) | 4 | 2 | POOLING1 + CONV7 |
| 792 | UPSAMPLING3 | | | | | 1(2)/1(2) | 4 | 2 | CONV7 |
| 794 | UPSAMPLING4 | | | | | 1(2)/1(2) | 2 | 1 | UPSAMPLING3 + UPSAMPLING2 |
| 796 | UPSAMPLING5 | | | | | 1(2)/1(2) | 4 | 1 | CONV7 |
| 798 | OUTPUT | | | | | 1(2)/1(2) | 1 | 1 | UPSAMPLING5 + UPSAMPLING4 |

DETAILED ARCHITECTURE OF SEQUENTIAL RefineNet FOR DISPARITY. K IS KERNAL SIZE, R IS DILATE CONVOLUTION RATE, E IS EXPANSION FACTOR IN EACH BLOCK, S MEANS STRIDE, CHANNELS IS NUMBER OF INPUT/OUTPUT CHANNELS. I/O ARE DOWN SAMPLE FACTORS, + MEANS ADDITION, & IS CONCATENATE.

| | LAYER | K | S | CHANNELS | I | O | INPUT CHANNELS |
|---|---|---|---|---|---|---|---|
| 804 | CONV1 | 3 | 1 | 13(14)/16 | 1 | 1 | LEFT + RIGHT + WARPED + ERR + INITD |
| 806 | CONV1_1 | 3 | 1 | 16/32 | 1 | 1 | CONV1 |
| 808 | CONV2 | 3 | 2 | 32/32 | 1 | 2 | CONV1_1 |
| 810 | CONV2_1 | 3 | 1 | 32/32 | 2 | 2 | CONV2 |
| 812 | CONV3 | 3 | 2 | 32/64 | 2 | 4 | CONV2_1 |
| 814 | CONV3_1 | 3 | 1 | 64/64 | 4 | 4 | CONV3 |
| 816 | CONV4 | 3 | 2 | 64/128 | 4 | 8 | CONV3_1 |
| 818 | CONV4_1 | 3 | 1 | 128/128 | 8 | 8 | CONV4 |
| 822 | RES_8 | 3 | 1 | 128/1 | 8 | 8 | CONV4_1 |
| 821 | PR_S1_8 | | | 1(2)/1(2) | 8 | 1 | INITD |
| 823 | PR_S2_8 | | | 1(2)/1(2) | 8 | 8 | PR_S1_8 + RES_8 |
| 820 | UPCONV3 | 4 | 2 | 128/64 | 8 | 4 | CONV4_1 |
| 826 | ICONV3 | 3 | 1 | 129(130)/64 | 4 | 4 | UPCONV3 + CONV3_1 + PR_S2_8 |
| 830 | RES_4 | 3 | 1 | 64/1(2) | 4 | 4 | ICONV3 |
| 829 | PR_S1_4 | | | 1(2)/1(2) | 1 | 4 | INITD |
| 831 | PR_S2_4 | | | 1(2)/1(2) | 4 | 4 | PR_S1_4 + RES_4 |
| 828 | UPCONV2 | 4 | 2 | 64/32 | 4 | 2 | ICONV3 |
| 834 | ICONV2 | 3 | 1 | 65/32 | 2 | 2 | UPCONV2 + CONV2_1 + PR_S2_4 |
| 838 | RES_2 | 3 | 1 | 32/1 | 2 | 2 | ICONV2 |
| 837 | PR_S1_2 | | | 1(2)/1(2) | 2 | 2 | INITD |
| 839 | PR_S2_2 | | | 1(2)/1(2) | 2 | 2 | PR_S1_2 + RES_2 |
| 836 | UPCONV1 | 4 | 2 | 32/16 | 2 | 1 | ICONV2 |
| 842 | RES_1 | 3 | 1 | 33(34)/1(2) | 1 | 1 | UPCONV1 + CONV1 + PR_S2_2 |
| 844 | PR_S2 | | | | 1 | 1 | INITD + RES_1 |

K IS KERNAL SIZE, S MEANS STRIDE, CHANNELS IS NUMBER OF INPUT/OUTPUT CHANNELS, I/O ARE DOWN SAMPLE FACTORS

FIG. 8B

| | DISPARITY IMAGE | 3-PIXEL ERROR VISUALIZATION | 3-PIXEL ERROR | |
|---|---|---|---|---|
| | | | FOR IMAGE | AVERAGE |
| DMPAC STEREO | | | 7.32% | 8.78% |
| DMPAC STEREO + RefineNet (SEQUENTIAL) | | | 2.15% | 6.44% |
| DMPAC SDE + RefineNet (SIMPLE HOURGLASS) | | | 0.90% | 5.88% |

CASCADED ARCHITECTURE FOR DISPARITY AND MOTION PREDICTION WITH BLOCK MATCHING AND CONVOLUTIONAL NEURAL NETWORK (CNN)

BACKGROUND

1. Field

The field relates to image processing using neural networks.

2. Description of the Related Art

Electronics use in automobiles is increasing daily. In addition to the conventional engine controller, transmission controller, infotainment unit, body controller and the like, the advent of numerous safety and autonomous systems are greatly increasing the processing done inside an automobile. For example, adaptive cruise control may entail intercommunication between a radar system, an engine controller and a transmission controller. More advanced features, such as collision avoidance and autonomous operation, may require significant image processing, particularly disparity and motion prediction.

Traditional block matching based stereo and optical flow engines provide reasonable quality of disparity and motion streams, respectively, and they are suitable for hardware acceleration for real-time processing. The term disparity refers to the shift that occurs at each pixel in a frame between the left and right images due the different perspectives of the cameras used to capture the two images. The term motion refers to the shift that occurs at each pixel in a frame between successive frames. Hardware acceleration can be done as the basic algorithms are capable of being performed by dedicated, special function hardware logic engines. A DMPAC (Disparity and Motion Prediction Acceleration Core) hardware acceleration module implements semi-global block matching and Lucas-Kanade method for stereo and optical flow, respectively, to provide quite accurate disparity and motion streams efficiently in real time.

Semi-global block matching is based on the idea of pixelwise matching of mutual information and approximating a global, 2D smoothness constraint by combining many 1D constraints. The algorithm has distinct processing steps, assuming a general stereo geometry of two or more images with known epipolar geometry. First, pixelwise costs are calculated. Second, a smoothness constraint is applied. Next, the disparity is determined with sub-pixel accuracy and occlusion detection. For more details see H. Hirschmuller, "Accurate and Efficient Stereo Processing by Semi-Global Matching and Mutual Information," IEEE Computer Science Conference on Computer Vision and Pattern Recognition, Vol. 2, Jun. 20-25, 2005, pp. 807-814 and H. Hirschmuller, "Stereo Processing by Semi-Global Matching and Mutual Information," IEEE Transactions on Pattern Analysis and Machine Intelligence, Vol. 30, No. 2, February 2008, pp. 328-341.

The Lucas-Kanade method is a widely used differential method for optical flow estimation developed by Bruce D. Lucas and Takeo Kanade. It assumes that the flow is essentially constant in a local neighborhood of the pixel under consideration, and solves the basic optical flow equations for all the pixels in that neighborhood, by the least squares criterion. For more details see B. Lucas, & T. Kanade, "An Iterative Image Registration Technique with an Application to Stereo Vision," Proceedings of the 7th International Joint Conference on Artificial Intelligence, 1981, pp. 121-130 and B. Lucas, "Generalized Image Matching by the Method of Differences," Carnegie-Mellon University, Department of Computer Science, 1984.

However, the DMPAC module has limitations, most pronounced in ambiguous regions with insufficient texture, repeated pattern, occlusion, etc. In contrast, convolutional neural network (CNN)-based end-to-end learning approaches have shown superior performance over traditional block matching based approaches, especially for ambiguous regions. However, such CNNs require excessively high computation, data movement and memory and therefore are not practical for real-time processing.

SUMMARY

To improve operations in images having ambiguous regions and yet operate in real time, a CNN operates on the disparity or motion stream outputs of a block matching hardware module, such as a DMPAC module, to produce refined disparity or motion streams. As the block matching hardware module provides most of the processing, the CNN can be small and thus able to operate in real time, in contrast to CNNs which are performing all of the processing. In one example, the CNN operation is performed only if the block hardware module output confidence level is below a predetermined amount. The CNN can have a number of different configurations and still be sufficiently small to operate in real time on conventional platforms.

BRIEF DESCRIPTION OF THE FIGURES

The patent or application file contains at least one drawing executed in color. Copies of this patent or patent application publication with color drawing(s) will be provided by the Office upon request and payment of the necessary fee.

For a detailed description of various examples, reference will now be made to the accompanying drawings in which:

FIGS. 7A and 7B are diagrams of a first example of an encoder decoder refine network as the CNN of FIGS. 4 and 5.

FIGS. 7D and 7E are diagrams of a second example of an encoder decoder refine network as the CNN of FIGS. 4 and 5.

FIGS. 8A and 8B are diagrams of one example of an hourglass refine network as the CNN of FIGS. 4 and 5.

FIG. 9 is an illustration of the outputs of the CNNs of FIGS. 6 and 8A and 8B compared to the output of the DMPAC alone.

Figures 10A, 10B:
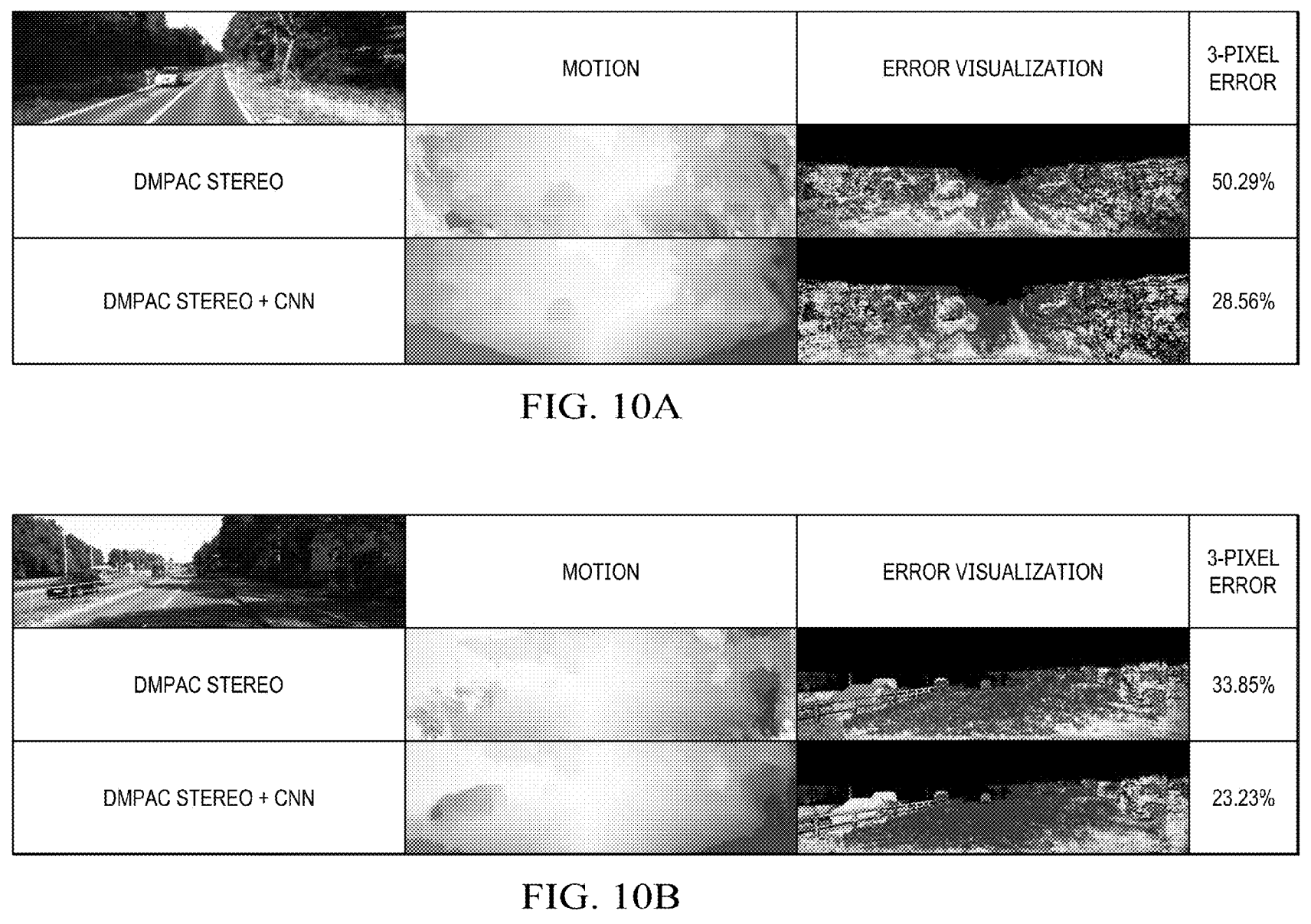

FIGS. 10A-10D are illustrations of the outputs of the CNNs of FIGS. 7D and 7E compared to the output of the DMPAC alone.

DETAILED DESCRIPTION

Figure 1:
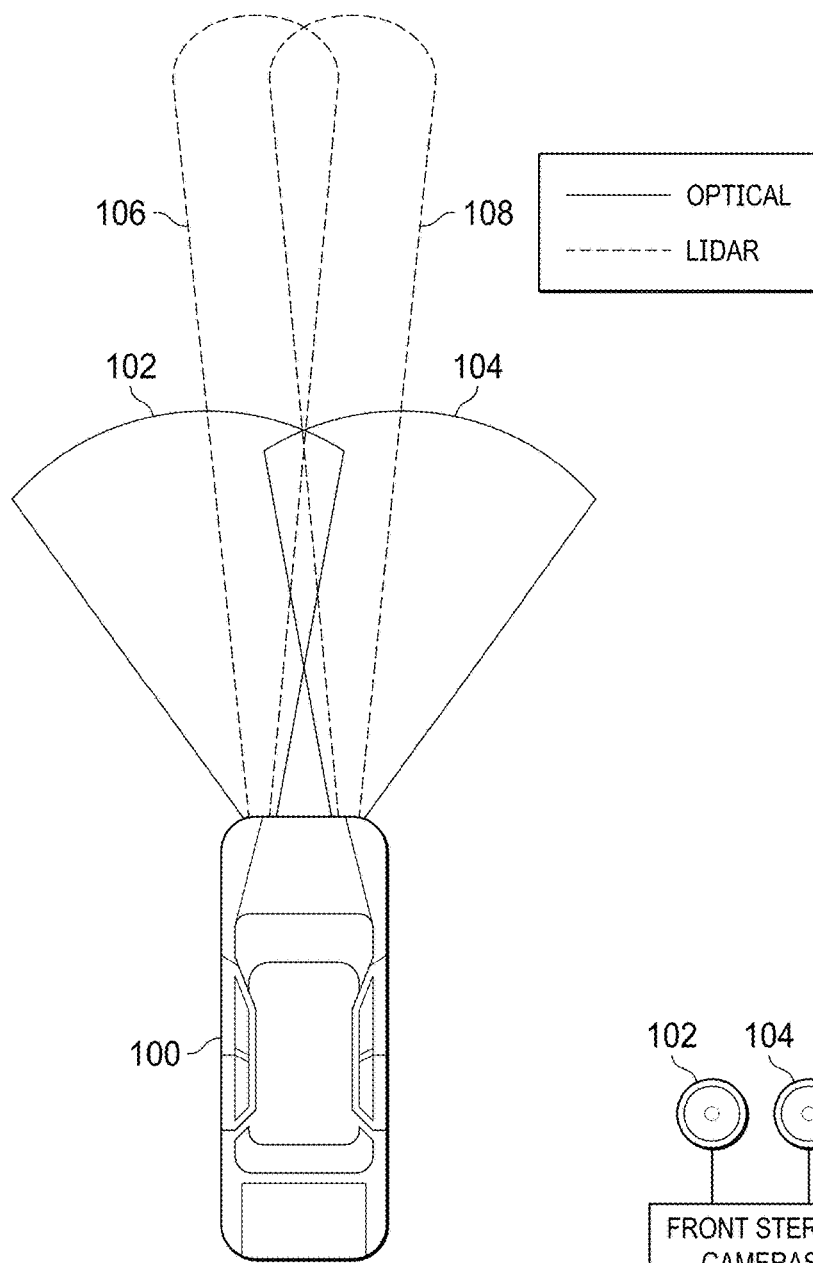
FIG. 1 is a drawing of a vehicle and the fields of view of various sensors.

Referring now to FIG. 1, a vehicle 100 is shown. The vehicle 100 includes a series of cameras or optical sensors. Left camera 102 and right camera 104 provide images from the front of the vehicle 100 for lane departure warnings, traffic sign recognition, collision alert and object detection. A left LIDAR (light detecting and ranging) sensor 106 and a right LIDAR sensor 108 provide image streams from the front of the vehicle 100 for lane and object detection. These camera and LIDAR sensors provide the input streams to various advanced driver assistance systems (ADAS). Cameras and LIDAR sensors are just examples and many other sensors, such as radar and ultrasonic and the like can be used as well.

Figure 2:
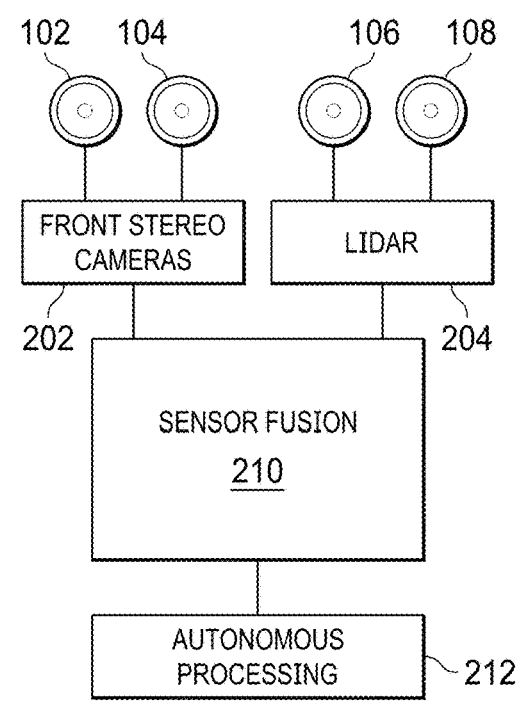
FIG. 2 is a block diagram of the sensors in the vehicle of FIG. 1.

Referring now to FIG. 2, cameras 102 and 104 are connected to a front cameras module 202. LIDAR sensors 106 and 108 are connected to a LIDAR module 204. The front cameras module 202 and the LIDAR module 204 are connected to a sensor fusion module 210 which integrates the various sensor outputs developed by the other modules. An autonomous processing module 212 is connected to the sensor fusion module 210 to perform autonomous processing needed for vehicle operation. More or fewer sensors can be connected to a given module and multiple sensor types can be provided to a single module.

Figure 3:
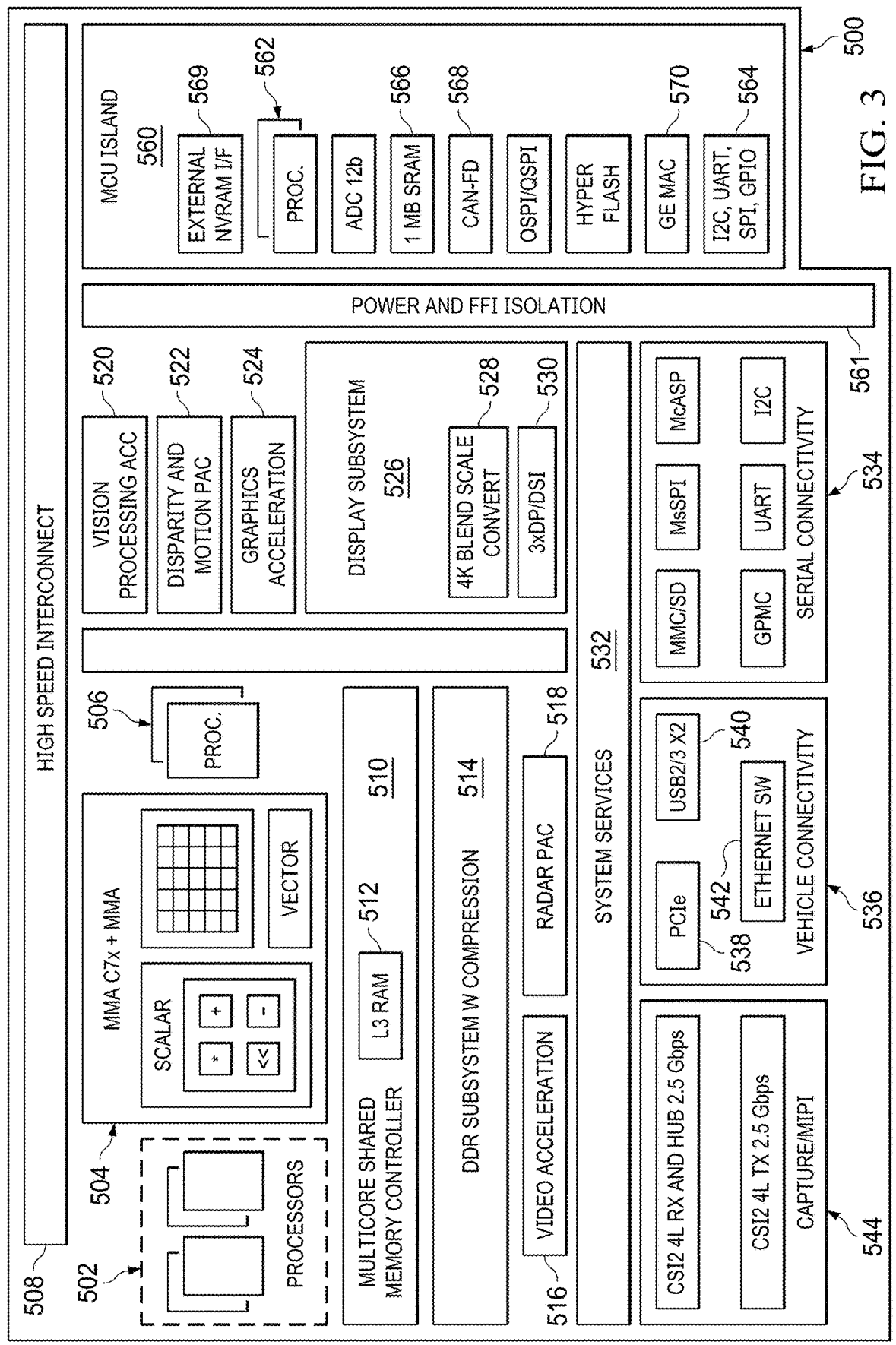
FIG. 3 is a block diagram of an SoC as used in the sensor modules of FIG. 2.

FIG. 3 is a block diagram of an exemplary system on a chip (SoC) 500 as can be used in the modules 202, 204, 210 or 212. A series of more powerful microprocessors 502, such as ARM® A72 or A53 cores, form the primary general-purpose processing block of the SoC 500, while a digital signal processor (DSP) 504 provides specialized computing capabilities. A simpler microprocessor 506, such as an ARM R5F core, provides general control capability in the SoC 500. A high-speed interconnect 508 connects the microprocessors 502, DSP 504 and microprocessor 506 to various other components in the SoC 500. For example, a shared memory controller 510, which includes onboard memory or RAM 512, is connected to the high-speed interconnect 508 to act as the onboard RAM for the SoC 500. A DDR memory controller system 514 is connected to the high-speed interconnect 508 and acts as an external interface to external DRAM memory. A video acceleration module 516 and a radar processing accelerator (PAC) module 518 are similarly connected to the high-speed interconnect 508. A vision processing accelerator module 520 is connected to the high-speed interconnect 508, as is a depth and motion PAC (DMPAC) module 522. The DMPAC module 522 is discussed in more detail in U.S. patent application Ser. No. 15/073,078, entitled "Hybrid Tiling Strategy for Semi-Global Matching Stereo Hardware Acceleration," filed Mar. 17, 2016, now U.S. Pat. No. 10,080,007; Ser. No. 15/012,829, entitled "Semi-Global Matching (SMG) Cost Compression," filed Feb. 1, 2016, published as Publication No. 2016/0227237; Ser. No. 15/081,118, entitled "Quasi-Parametric Optical Flow Estimation," filed Mar. 25, 2016, now U.S. Pat. No. 10,268,901; Ser. No. 15/684,321, entitled "Handling Perspective Magnification in Optical Flow Processing," filed Aug. 23, 2017, published as Publication No. 2018/0181816; and Ser. No. 15/695,266, entitled "Image Compression/Decompression in a Computer Vision System," filed Sep. 5, 2017, published as Publication No. 2019/0073740, all of which are hereby incorporated by reference.

A graphics acceleration module 524 is connected to the high-speed interconnect 508. A display subsystem 526 is connected to the high-speed interconnect 508 and includes conversion logic 528 and output logic 530 to allow operation with and connection to various video monitors. A system services block 532, which includes items such as DMA controllers, memory management units, general-purpose I/O's, mailboxes and the like, is provided for normal SoC 500 operation. A serial connectivity module 534 is connected to the high-speed interconnect 508 and includes modules as normal in an SoC. A vehicle connectivity module 536 provides interconnects for external communication interfaces, such as PCIe block 538, USB block 540 and an Ethernet switch 542. A capture/MIPI module 544 includes a four-lane CSI-2 compliant transmit block 546 and a four-lane CSI-2 receive module and hub.

An MCU island 560 is provided as a secondary subsystem and handles operation of the integrated SoC 500 when the other components are powered down to save energy. An MCU ARM processor 562, such as one or more ARM R5F cores, operates as a master and is coupled to the high-speed interconnect 508 through an isolation interface 561. An MCU general purpose I/O (GPIO) block 564 operates as a slave. MCU RAM 566 is provided to act as local memory for the MCU ARM processor 562. A CAN bus block 568, an additional external communication interface, is connected to allow operation with a conventional CAN bus environment in the vehicle 100. An Ethernet MAC (media access control) block 570 is provided for further connectivity in the vehicle 100. External memory, generally non-volatile memory (NVM) is connected to the MCU ARM processor 562 via an external memory interface 569 to store instructions loaded into the various other memories for execution by the various appropriate processors. The MCU ARM processor 562 operates as a safety processor, monitoring operations of the SoC 500 to ensure proper operation of the SoC 500.

It is understood that this is one example of an SoC provided for explanation and many other SoC examples are possible, with varying numbers of processors, DSPs, accelerators and the like.

Figure 4:
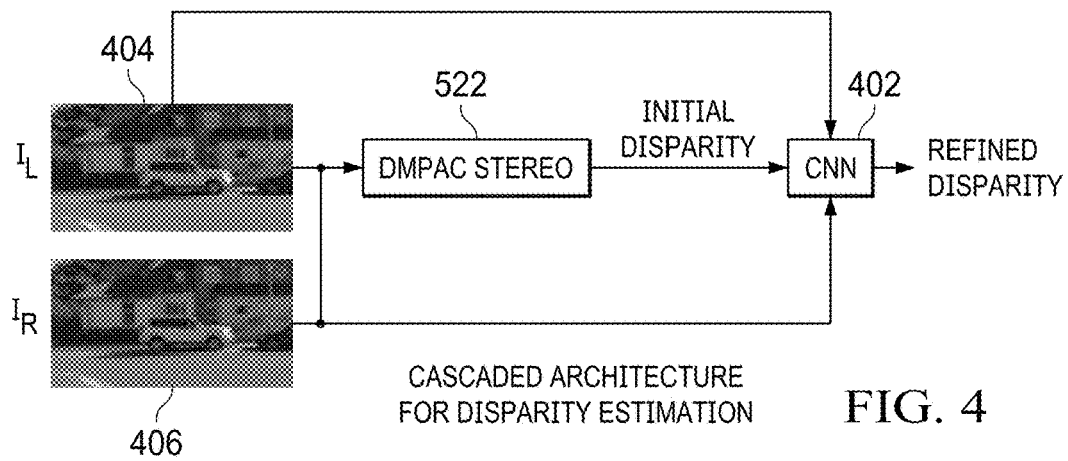
FIG. 4 is a block diagram of a cascaded CNN for stereo image processing.
Figure 5:
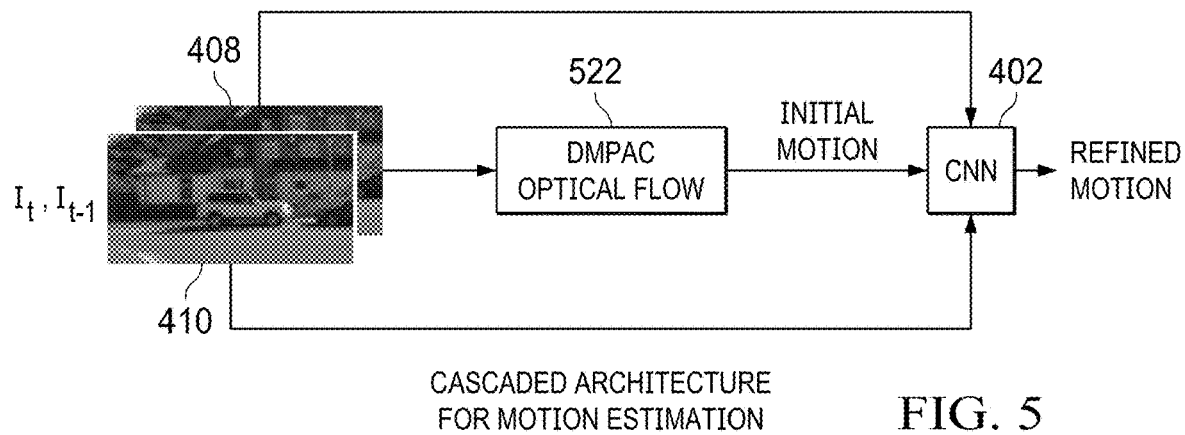
FIG. 5 is a block diagram of a cascaded CNN for optical flow image processing

The examples of FIGS. 4 and 5 are similar, using the DMPAC module 522 followed by a cascaded CNN 402 executed on the DSP 504 to act as an image processing system to provide enhanced disparity or motion stream outputs, generically referred to as refined displacement streams. In stereo operation as in FIG. 4, left and right image streams 404 and 406 are provided to the DMPAC module 522 and the CNN 402. The output of the DMPAC module 522 is considered an initial disparity stream to be refined by the CNN 402. This initial disparity stream and the left and right image streams 404 and 406 are provided to the CNN 402. The output of the CNN 402 is a refined disparity stream.

In optical flow operation as in FIG. 5, successive or current and previous image streams 408 and 410 are provided to the DMPAC module 522. In this case, the output of the DMPAC module 522 is considered an initial motion stream to be refined by the CNN 402. This initial motion stream and the current and previous image streams 408 and 410 are provided to the CNN 402. The output of the CNN 402 is a refined motion stream. The disparity and motion streams provided from the DMPAC module 522 are generically referred to as displacement streams.

The use of the CNN 402 cascaded with the DMPAC module 522 provides improved disparity and motion stream outputs compared to just the DMPAC module 522 alone. The CNN 402 is much smaller than the end-to-end CNNs discussed above as it uses many fewer layers and thus requires many fewer calculations, so the combination can provide real time operation.

While previously the outputs of the DMPAC module 522 were used by the various functions, such as collision avoidance and autonomous operation, now the refined disparity and motion stream outputs of the CNN 402 are used in the various functions.

In the examples of FIGS. 4 and 5, the CNN 402 is developed by executing software instructions on the DSP 504, the instructions stored in the NVM connected to the MCU ARM processor 562 and loaded into RAM 512 for use by the DSP 504. The DMPAC module 522 outputs are provided to the RAM 512 or other memory and then retrieved by the DSP 504 to perform the CNN function. In other examples the CNN can be a hardware CNN present on the SoC or can be a combination of a hardware CNN and a DSP executing software instructions.

The DMPAC module 522 is one example of a block matching system and other more traditional block matching systems can be used instead of the DMPAC module 522, the CNN 402 improving the results of those other block matching systems as the CNN 402 improves the output of the DMPAC module 522.

In one example the operation of the CNN 402 is a refine network (RefineNet) that has been taught to predict a residual correction value to combine with original disparity or motion values to provide a refined disparity or motion value. For disparity or stereo operation, mathematically this is stated as:

$$d_2 = d_1 + F_r(I_L, I_R, \tilde{I}_L, E_L, d_1)$$

where $d_1$ = initial disparity
$d_2$ = refined disparity
$F_r$ = correction function
$I_L$ = left image
$I_R$ = right image
$\tilde{I}_L$ = warped or reconstructed left image—right image and disparity
$E_L$ = error image—displacement between $I_L$ and $\tilde{I}_L$ For optical flow or motion operation, $I_L$ becomes $I_{t-1}$, $I_R$ becomes $I_t$, $\tilde{I}_L$ becomes $\tilde{I}_{t-1}$, $E_L$ becomes $E_{t-1}$, $d_1$ becomes $d_{1x}$, $d_{1y}$, and $d_2$ becomes $d_{2x}$, $d_{2y}$.

Figure 4A:
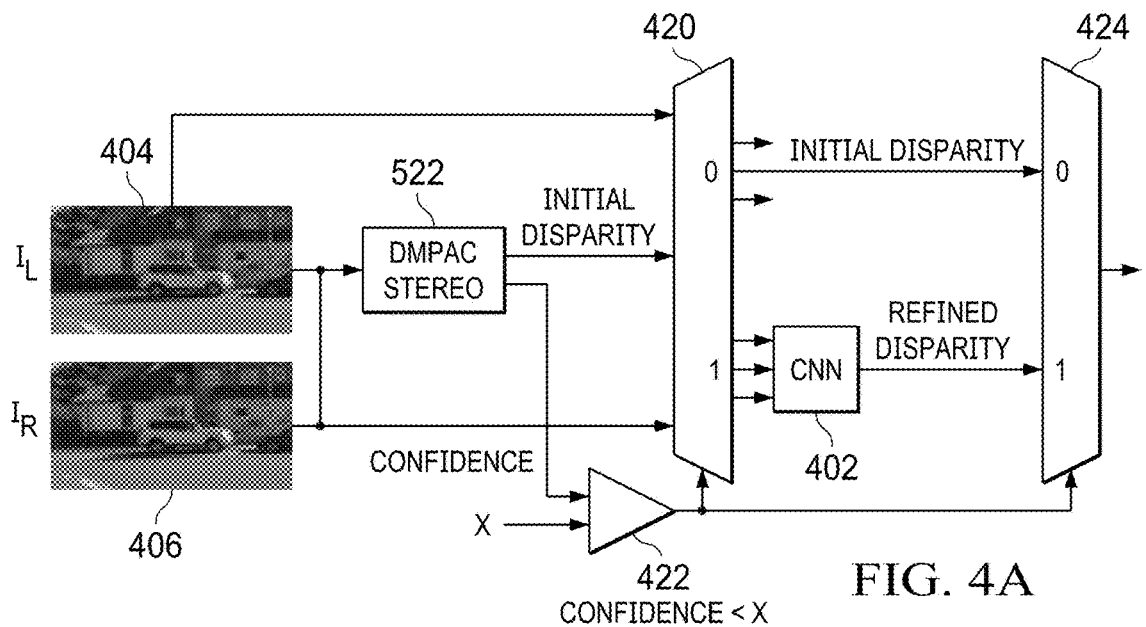
FIG. 4A is a block diagram of the cascaded CNN of FIG. 4 allowing bypassing of the cascaded CNN.

In one example, illustrated in FIG. 4A, to reduce required processing for stereo operations, a confidence stream provided by the DMPAC module 522 is used to determine if the initial disparity value will be sufficiently improved by the CNN 402 to merit the additional processing. The confidence stream is a quantitative estimate of the correctness of the disparity or motion output stream. If the confidence stream value is over a threshold value, then the initial disparity value from the DMPAC module 522 is used without being improved by the CNN 402. Example confidence stream values vary based on the amount of improvement needed for the particular function. For example, a confidence stream value of 5 as the threshold value is used when less accuracy is required, while confidence stream values such as 6 or 7 are used when accuracy is more critical to the proper operation of the function.

This comparator logic shown diagrammatically in FIG. 4A by having the left and right image streams and the initial disparity stream as inputs to a demultiplexer 420. The control of the demultiplexer 420 is provided by the output of a comparator 422. The comparator 422 compares the confidence stream value from the DMPAC module 522 to the threshold value, shown as X, and provides a true output if the confidence stream value is less than the threshold value. The 1 or true outputs of the demultiplexer 420 are provided to the CNN 402. The refined disparity output of the CNN 402 is provided to the 1 or true input of a multiplexer 424, with control of the multiplexer 424 being the output of the comparator 422. The initial disparity value is provided from the 0 or false output of the demultiplexer 420 to the 0 or false input of the multiplexer 424. The output of the multiplexer 424 is then the initial disparity if the confidence stream value is greater than the threshold value and the refined disparity from the CNN 402 if the confidence stream value is less than the threshold value.

Figure 4B:
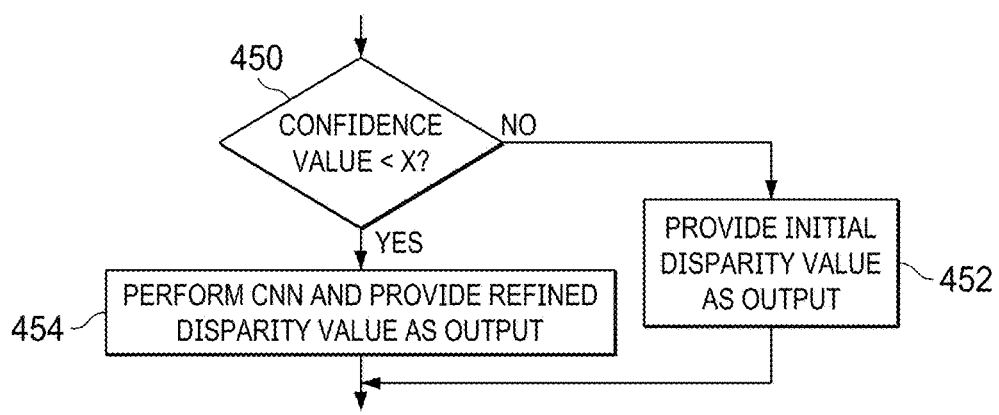
FIG. 4B is a flowchart of the operation of FIG. 4A.

The CNN 402 is developed by software instructions executing on the DSP 504; the comparator logic is shown in flowchart format in FIG. 4B. The comparison against the threshold value is performed by the DSP 504 at step 450 before the CNN 402 operations are performed. If the confidence stream value is greater than the threshold value, the DSP 504 simply passes the initial disparity value through in step 452 and does not perform the CNN 402 operations. If the confidence stream value is less than the threshold value, in step 454 the CNN 402 operations are performed, and the refined disparity output is provided.

Figure 6:
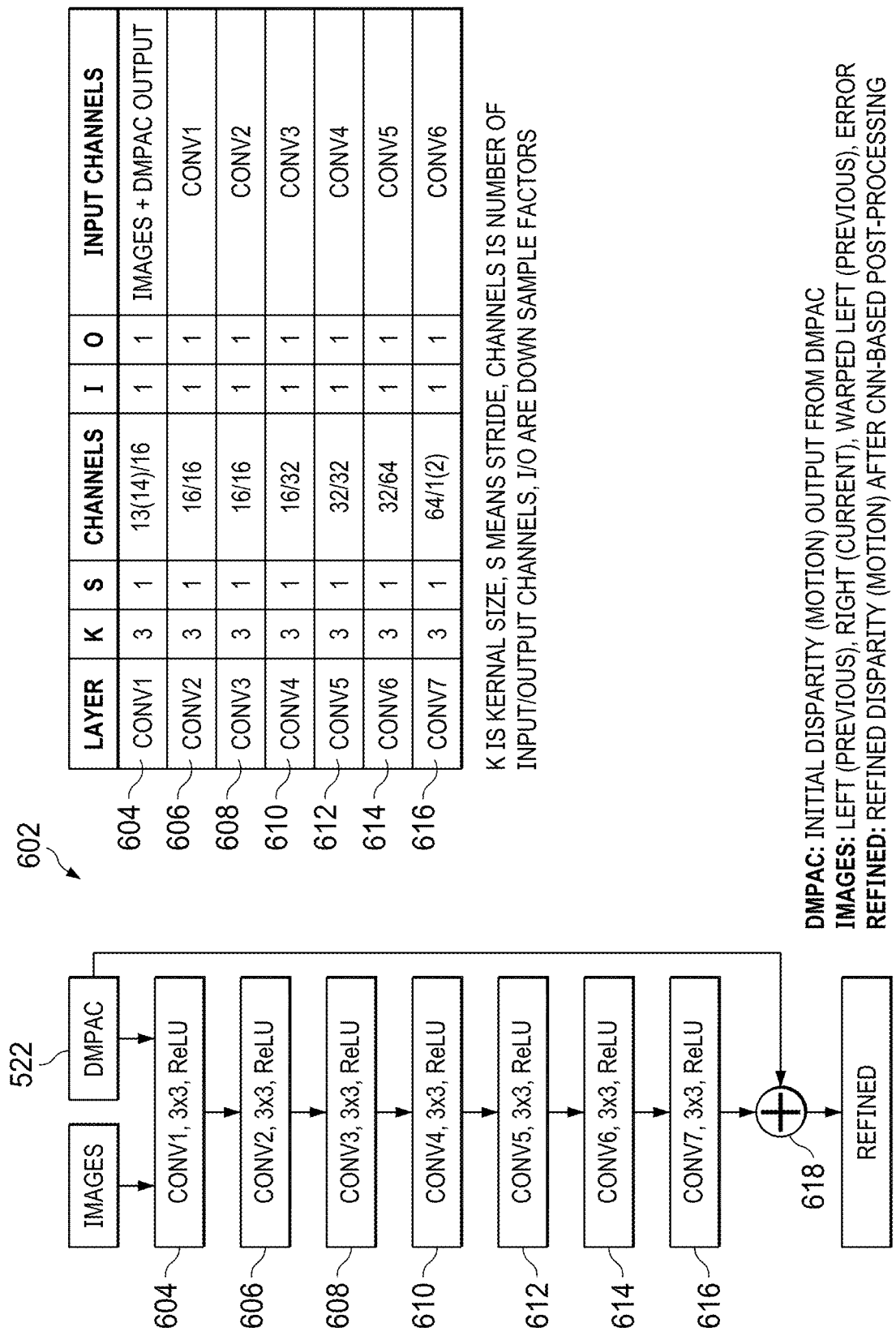
FIG. 6 is a diagram of one example of a sequential refine network as the CNN of FIGS. 4 and 5.

FIG. 6 illustrates one example of a sequential refine network configuration 602 for the CNN 402 developed using seven 3×3 convolutional layers with a rectified linear unit (ReLu) for non-linearity. The first layer 604 has 13 input channels for disparity operation and 14 input channels for optical flow. The input channels for disparity operation are the red, green and blue (RGB) streams of the various images $I_L$, $I_R$, $\tilde{I}_L$, and $E_L$ and the $d_1$ stream from the DMPAC module 522. The input channels for optical flow are the RGB streams for the various images $I_{t-1}$, $I_t$, $\tilde{I}_{t-1}$, and $E_{t-1}$, and the $d_{1x}$ and $d_{1y}$ streams from the DMPAC module 522. The first layer 604 has 16 output channels.

The outputs of the first layer 604 are provided as inputs to a second layer 606, which has 16 output channels. The 16 output channels of the second layer 606 are the inputs to a third layer 608, which also has 16 output channels. The 16 output channels of the third layer 608 are the inputs to a fourth layer 610. The fourth layer 610 has 32 output channels, which are the inputs to a fifth layer 612. The fifth layer 612 has 32 output channels, which are the inputs to a sixth layer 614. The sixth layer 614 has 64 output channels, which are the inputs to a seventh layer 616. The seventh layer 616 has one output channel for disparity and two output channels for motion. A summer 618 combines the output streams from the seventh layer 616 with the disparity or motion streams from the DMPAC module 522 to produce the refined disparity or motion streams. In one example, the sequential refine network configuration 602 has only 33,000 parameters and a receptive field size of 15×15.

Figure 7C:
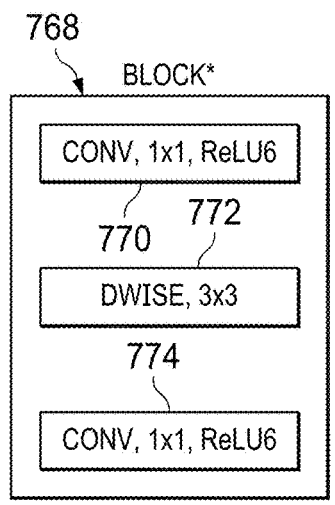
FIG. 7C is a diagram of a block in FIG. 7A.
Figure 7A:
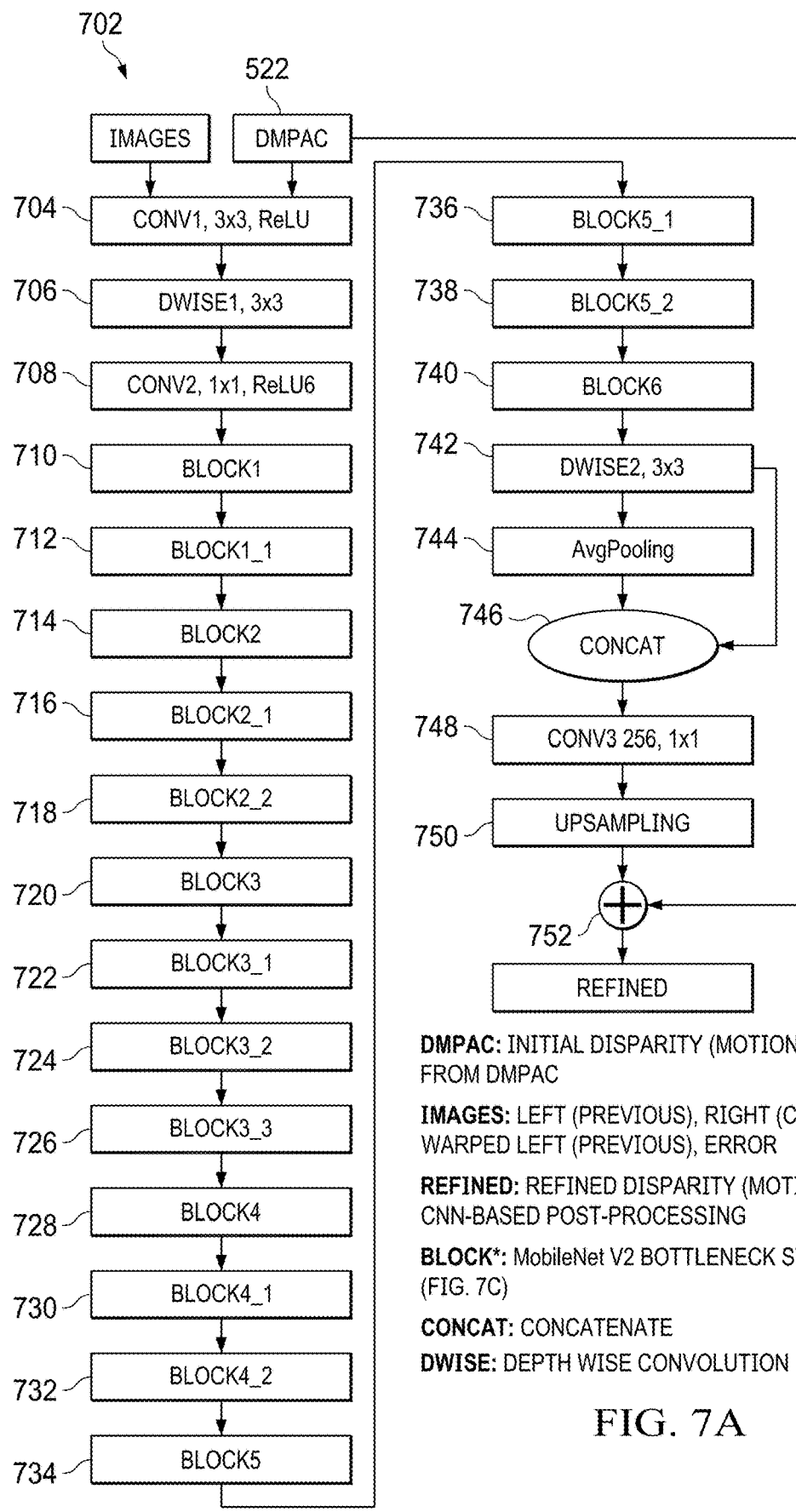

FIGS. 7A and 7B are a first example for an encoder-decoder structured refine network configuration 702. A first layer 704 is 3×3 convolutional layer with ReLu with a stride of 2 and downsampling of two. The first layer 704 has 13 input channels for disparity and 14 input channels for optical flow. The input channels for disparity are the RGB streams of the various images $I_L$, $I_R$, $\tilde{I}_L$, and $E_L$ and the $d_1$ stream from the DMPAC module 522. The input channels for optical flow are the RGB streams for the various images $I_{t-1}$, $I_t$, $\tilde{I}_{t-1}$, and $E_{t-1}$ and the $d_{1x}$ and $d_{1y}$ streams from the DMPAC module 522. The first layer 704 has 32 output channels.

The 32 output channels from first layer 704 are provided to second layer 706. The second layer 706 is a 3×3 depthwise convolutional layer that has 32 output channels provided to a third layer 708. The third layer 708 is a 1×1 convolutional layer with ReLu6 and 16 output channels.

The output channels from the third layer 708 are provided to a first block 710 of a series of blocks. The block composition is illustrated in FIG. 7C. The block 768 is a MobileNetV2 linear bottleneck. A first layer 770 in the block 768 is a 1×1 convolutional layer with ReLu6. A second layer 772 in the block 768 is a 3×3 depthwise convolutional layer. The third layer 774 in the block 768 is another 1×1 convolutional layer with ReLu6. The block 768 has an expansion factor or E of six. This means that the output of the first layer 770 is six channels wide for each input channel, the second layer 772 is the same six channels wide for each input channel and then the third layer 774 reduces from the six channels per input channel back down to the desired number of output channels. The first block 710 has a stride of 2 and is a normal convolution. R values are the dilated convolution rate, so R values greater than one indicate dilated convolution, while an R value of one means normal convolution. The first block 710 provides a downsampling of two and has 24 output channels.

A second block 712 receives the 24 output channels from the first block 710 and has an R value of 1 and a stride of 1, with 24 output channels. A third block 714 receives the 24 output channels from the second block 712 and has an R value of 1 and a stride of 2, with 32 output channels, providing a further factor of two downsampling. A fourth block 716 receives the 32 output channels from the third block 714 and has an R value of 1 and a stride of 1, with 32 output channels. A fifth block 718 receives the 32 output channels from the fourth block 716 and has an R value of 1 and a stride of 1, with 32 output channels. A sixth block 720 receives the 32 output channels from the fifth block 718 and has an R value of 1 and a stride of 1, with 64 output channels. A seventh block 722 receives the 64 output channels from the sixth block 720 and has an R value of 2 and a stride of 1, with 64 output channels. An eighth block 724 receives the 64 output channels from the seventh block 722 and has an R value of 2 and a stride of 1, with 64 output channels. A ninth block 726 receives the 64 output channels from the eighth block 724 and has an R value of 2 and a stride of 1, with 64 output channels.

A tenth block 728 receives the 64 output channels from the ninth block 726 and has an R value of 2 and a stride of 1, with 96 output channels. An eleventh block 730 receives the 96 output channels from the tenth block 728 and has an R value of 2 and a stride of 1, with 96 output channels. A twelfth block 732 receives the 96 output channels from the eleventh block 730 and has an R value of 2 and a stride of 1, with 96 output channels. A thirteenth block 734 receives the 96 output channels from the twelfth block 732 and has an R value of 2 and a stride of 1, with 160 output channels. A fourteenth block 736 receives the 160 output channels from the thirteenth block 734 and has an R value of 2 and a stride of 1, with 160 output channels. A fifteenth block 738 receives the 160 output channels from the fourteenth block 736 and has an R value of 2 and a stride of 1, with 160 output channels. A sixteenth block 740 receives the 160 output channels from the fifteenth block 738 and has an R value of 2 and a stride of 1, with 320 output channels.

The 320 output channels of the sixteenth block 740 are provided to a fourth layer 742, which is a 3×3 depthwise convolutional layer that has 256 output channels. The 256 output channels of the fourth layer 742 are provided to an average pooling layer 744 with 256 output channels. The 256 output channels of the fourth layer 742 and the 256 output channels of the average pooling layer 744 are provided to a concatenation element 746, which has 512 output channels. The concatenated 512 output channels are provided to a fifth layer 748, which is a 1×1 convolutional layer and has two output channels. The two output channels are provided to an upsampling element 750, which upsamples by a factor of eight to return to the original channel density and provides one output channel for disparity and two output channels for motion. The upsampled output channels are added by a summer 752 with the disparity or motion streams from the DMPAC module 522 to produce the refined disparity or motion streams. While the encoder-decoder structured refine network configuration 702 has many more stages than the sequential refine network configuration 602, in one example the receptive field size is greater at 374×374 and the computational complexity, the total number of multiplications and additions, is similar because of the simplicity of the MobileNetV2 configuration and the downsampling. The larger receptive size allows further improvements in the disparity by removing more noise on flat areas and repeated patterns.

Figure 7D:
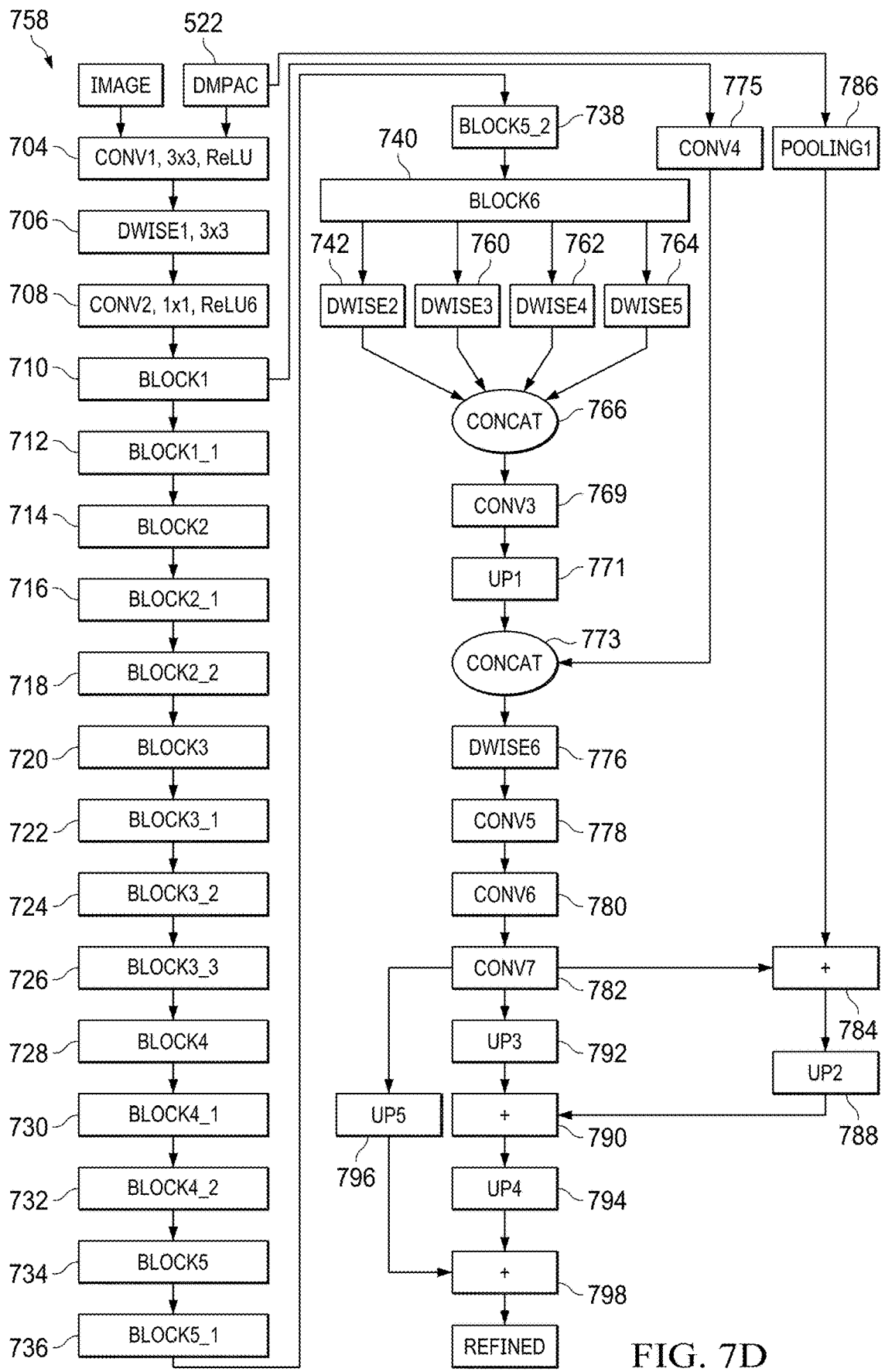

FIGS. 7D and 7E are a second example of an encoder-decoder structured refine network configuration 758. This second example encoder-decoder of FIGS. 7D and 7E differs from the first example encoder-decoder of FIGS. 7A and 7B in that only the $I_L$ or left or previous image and $d_1$ or $d_{1x}$ and $d_{1y}$ disparity streams are used. Layer 704 to layer 742 are the same as the encoder-decoder structured refine network configuration 702. The 320 output channels of the sixteenth block 740 are provided to fifth through seventh layers 760, 762, 764, which are 3×3 depthwise convolutional layers that have 256 output channels. Fourth through seventh layers 742, 760-764 are similar except each has a different dilation or R value. The R value of the fourth layer 742 is one, the R value of the fifth layer 760 is six, the R value of the sixth layer 762 is twelve and the R value of the seventh layer 764 is 18. The 256 channel outputs of the fourth through seventh layers 742, 760-764 are provided to a first concatenation element 766, which has 1024 output channels. The 1024 output channels are provided to an eighth layer 769, which is a 3×3 depthwise convolutional layer that has 256 output channels. The 256 output channels are provided to a first upsampling layer 770 which provides an upsampling of two. The 256 output channels of the first upsampling layer 771 are provided to a second concatenation element 773.

The 24 output channels of the first block 710 are also provided to a ninth layer 775, which provides 48 output channels. The 48 output channels are provided to the second concatenation element 773. The 304 output channels of the second concatenation element 773 are provided to a tenth layer 776, a 3×3 depthwise convolutional layer that has 304 output channels. The 304 output channels are provided to an eleventh layer 778, a convolutional layer with 256 output channels. The 256 output channels are provided to a twelfth layer 780, a convolutional layer with 256 output channels. The 256 output channels are provided to a thirteenth layer 782, a convolutional layer with one output channel for disparity operation and two output channels for motion operation. The output of the thirteenth layer 782 is provided to a first summer 784.

The disparity or motion outputs of the DMPAC module 522 are provided to a pooling layer 786, which downsamples the streams by a factor of four. The output of the pooling layer 786 is provided to the first summer 784. The output of the first summer 784 is provided to a second upsampling layer 788, which upsamples by a factor of two. The output of the second upsampling layer 788 is provided to a second summer 790.

The output of the thirteenth layer 782 is also provided to a third upsampling layer 792, which upsamples by a factor of two. The output of the third upsampling layer 792 is provided to the second summer 790. The output of the second summer 790 is provided to a fourth upsampling layer 794, which upsamples by a factor of two, returning to the original channel density. The output of the fourth upsampling layer 794 is provided to a third summer 798.

The output of the thirteenth layer 782 is also provided to a fifth upsampling layer 796, which upsamples by a factor of two. The output of the fifth upsampling layer 796 is provided to the third summer 798. The output of the third summer 798 is the refined disparity or motion streams.

Figure 8C:
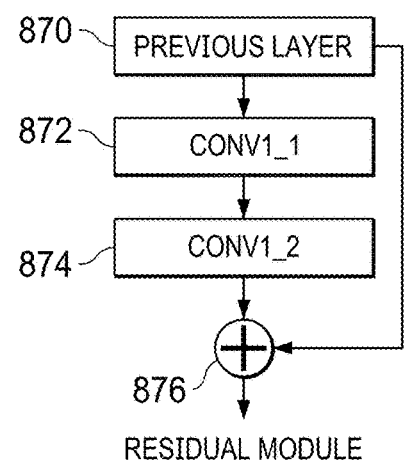
FIG. 8C is a diagram of a block in FIG. 8A.
Figure 8A:
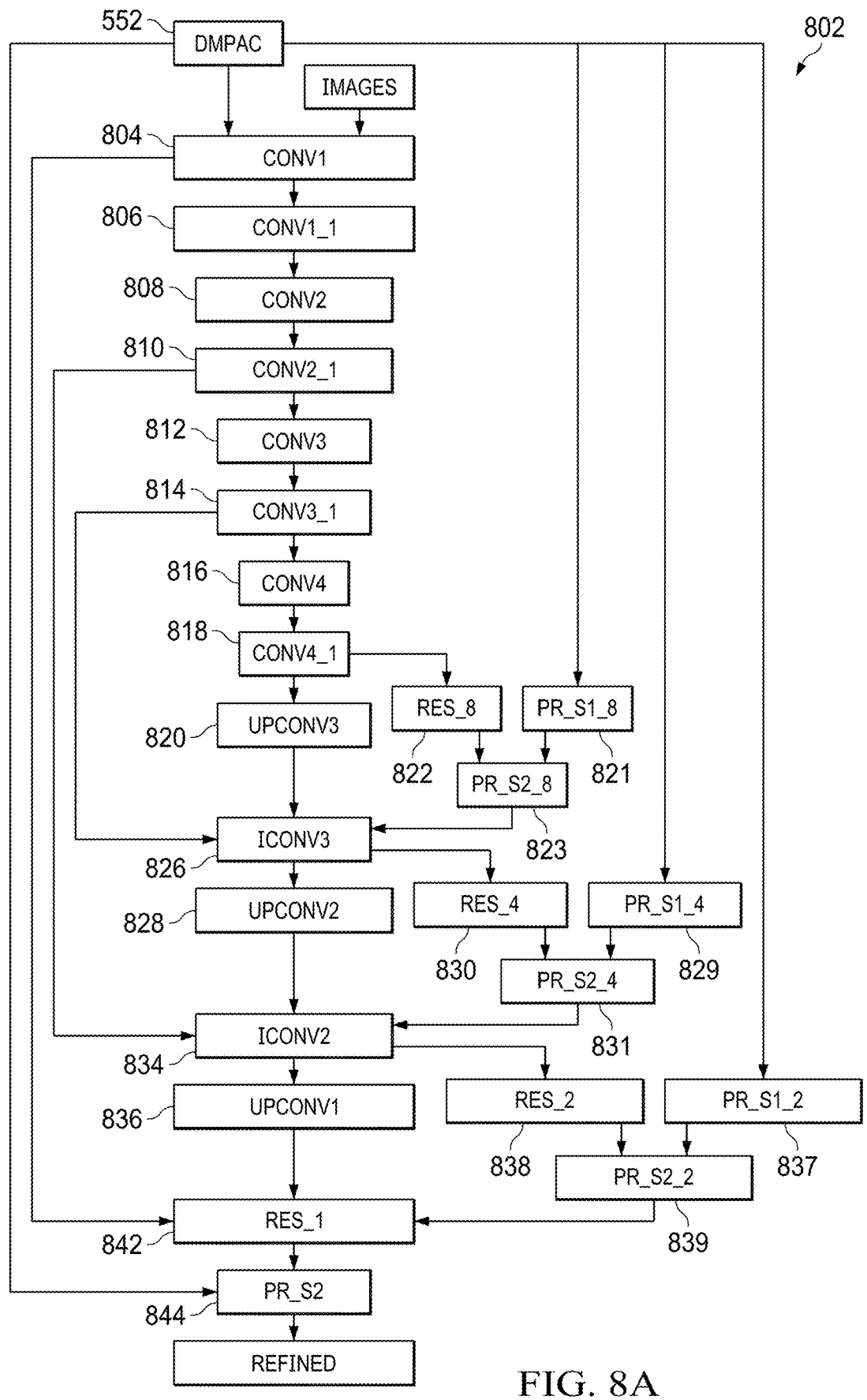
Figure 10C:
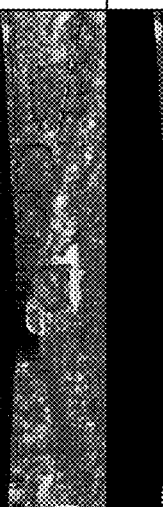
Figure 10D:

FIGS. 8A, 8B and 8C are one example for an hourglass refine network configuration 802. A first layer 804 is a 3×3 convolutional layer, with 13 disparity or 14 optical flow input channels as described above and 16 output channels. A second layer 806 receives the 16 output channels from first layer 804 and is a 3×3 convolutional layer, with 32 output channels. A third layer 808 receives the 32 output channels from second layer 806 and is a 3×3 convolutional layer, with a step size of two, to provide a downsampling of two, and 32 output channels. A fourth layer 810 receives the 32 output channels from third layer 808 and is a 3×3 convolutional layer, with 32 output channels. A fifth layer 812 receives the 32 output channels from fourth layer 810 and is a 3×3 convolutional layer, with a step size of two, to provide a downsampling of two, and 64 output channels. A sixth layer 814 receives the 64 output channels from fifth layer 812 and is a 3×3 convolutional layer, with 64 output channels. A seventh layer 86 receives the 64 output channels from sixth layer 814 and is a 3×3 convolutional layer, with a step size of two, to provide a downsampling of two, and 128 output channels. An eighth layer 88 receives the 128 output channels from the seventh layer 86 and is a 3×3 convolutional layer, with 128 output channels.

The output of the eighth layer 818 is provided to a first residuals module 822 and a tenth layer 820. The first residuals module 822 is a residuals module as shown in FIG. 8C and has one output channel. A previous layer 870 has the outputs provided to a first convolutional layer 872, whose outputs are provided to a second convolutional layer 874. The outputs of the previous layer 870 and the second convolutional layer 874 are added elementwise by summer 876.

The disparity or motion stream of the DMPAC 552 is provided to a first downsampling layer 821, which downsamples the disparity or motion stream to match the eight times downsampled outputs of the first residuals module 822 and has one output channel. The outputs of the first downsampling layer 821 and the first residuals module 822 are summed by ninth layer 823, which has one output channel for disparity and two output channels for motion.

The tenth layer 820 is an upsampling convolutional layer with 64 output channels and an upsampling of two. The output channels of the sixth layer 814, the tenth layer 820 and the ninth layer 823 are provided to an eleventh layer 826, which is a concatenating layer, so that the eleventh layer 826 has 129 or 130 input channels. In addition to concatenating, the eleventh layer 826 is a convolutional layer with 64 output channels.

The output of the eleventh layer 826 is provided to a second residuals module 830 and a twelfth layer 828. The second residuals module 830 is a residuals module as shown in FIG. 8C and has one or two output channels. The disparity or motion stream of the DMPAC 552 is provided to a second downsampling layer 829, which downsamples the disparity or motion stream to match the four times downsampled outputs of the eleventh layer 826 and has one or two output channels. The outputs of the second downsampling layer 829 and the second residuals module 830 are summed by thirteenth layer 831, which has one or two output channels.

The twelfth layer 828 is an upsampling convolutional layer with 32 output channels and an upsampling of two. The output channels of the fourth layer 810, the twelfth layer 828 and the thirteenth layer 831 are provided to a fourteenth layer 834, which is a concatenating layer, so that the fourteenth layer 834 has 65 input channels. In addition to concatenating, the fourteenth layer 834 is a convolutional layer with 32 output channels.

The output of the fourteenth layer 834 is provided to a third residuals module 838 and a fifteenth layer 836. The third residuals module 838 is a residuals module as shown in FIG. 8C and has one output channel. The disparity output of the DMPAC 552 is provided to a third downsampling layer 837, which downsamples the disparity or motion output to match the two times downsampled outputs of the fourteenth layer 834 and has one or two output channels. The outputs of the third downsampling layer 837 and the third residuals module 838 are summed by sixteenth layer 839, which has one or two output channels.

The fifteenth layer 836 is an upsampling convolutional layer with 16 output channels and an upsampling of two. The output of the fifteenth layer 836 is concatenated with the output of the first layer 804 and the output of the sixteenth layer 839 to a fourth residuals module 842, so that the seventeenth layer has 33 input channels. The fourth residuals module 842 is a residuals module as shown in FIG. 8C and has one output channel.

A summer 844 combines the output of the fourth residuals module 842 and the disparity or motion stream of the DMPAC 552 to provide the refined disparity or motion stream.

These are four examples of CNN configurations to operate with a block matching hardware module such as a DMPAC module. These examples are small enough to operate in real time on standard SoCs. Many other CNN configurations can be developed based on the teachings provided by these examples and this description.

In one example, training of the stereo configuration was done using the KITTI stereo 2015 dataset, available at www.cvlibs.net/datasets/kitti/index.php and referenced generally in Andreas Geiger, Philip Lenz, and Raquel Urtasun, "Are we ready for autonomous driving? the KITTI vision benchmark suite," Proc. Computer Vision Pattern Recognition, 2012. The dataset was randomly divided into a training set (80%) and a test set (20%). During training, for each epoch, the training set was divided into a training part (90%) and a validation part (10%).

In one example, the KITTI stereo 2012 dataset was used for training instead of the KITTI stereo 2015 dataset.

In one example, training of the optical flow configuration was done using the virtual KITTI dataset available at europe.naverlabs.com/research/computer-vision/proxy-virtual-worlds. The dataset was divided into a training set (80%) and a test set (20%). For the virtual KITTI dataset, as it contains 5 different driving scenes, the division was done according to the driving scenario. During training, for each epoch, the training set was divided into a training part (90%) and a validation part (10%).

In one example the training was done using the Adam optimizer, Diederik P. Kingma and Jimmy Ba, "Adam: A method for stochastic optimization," 3rd International Conference for Learning Representations, San Diego, 2015, available at arxiv.org/abs/1412.6980. The initial learning rate R was 0.001. The validation loss was monitored to modify the learning rate. If the validation loss did not decrease for longer than N1=7 epochs, the learning rate was decreased by 50%. If the validation loss did not decrease for longer than N2=18 epochs, the training was stopped.

The results of using one example of the sequential configuration and one example of the hourglass configuration are shown in FIG. 9. The area in the blue rectangle was problematic as the image is of a shadow on a flat street, so that the image portion is highly uniform. The area in the green rectangle was problematic as the image is of a repeated pattern of a fence. As visible in FIG. 9, by comparing the red error portions and the results in the next to last column, the error is greatly reduced using either the sequential configuration or the hourglass configuration.

FIGS. 10A-10D are examples of the improvement of the second example encode-decode configuration of FIGS. 7D and 7E as shown by the various images.

The above description is intended to be illustrative, and not restrictive. For example, the above-described examples may be used in combination with each other. Many other examples will be apparent upon reviewing the above description. The scope should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An image processing system comprising:
a block matching hardware module having an input for receiving first and second image streams and an output for providing a displacement stream, wherein the block matching hardware module is configured to provide a confidence stream; and
a convolutional neural network (CNN) having an input coupled to the block matching hardware module for receiving the displacement stream and for receiving at least one of the first and second image streams, wherein the CNN is configured to selectively provide a refined displacement stream for disparity prediction or for motion prediction; and
comparator logic configured to:
responsive to a value of the confidence stream being greater than a threshold value, bypass the CNN and output the displacement stream;
responsive to the value of the confidence stream being less than the threshold value, provide and output the refined displacement stream.

2. The image processing system of claim 1,
wherein the first and second image streams are left and right image streams and the displacement stream and refined displacement stream are each disparity streams, and
wherein the CNN receives both of the first and second image streams.

3. The image processing system of claim 1,
wherein the first and second image streams are left and right image streams and the displacement stream and refined displacement stream are each disparity streams, and
wherein the CNN receives only one of the first and second image streams.

4. The image processing system of claim 1,
wherein the first and second image streams are current and previous image streams and the displacement stream and refined displacement stream are each motion streams, and
wherein the CNN receives both of the first and second image streams.

5. The image processing system of claim 1,
wherein the first and second image streams are current and previous image streams and the displacement stream and refined displacement stream are each motion streams, and
wherein the CNN receives only one of the first and second image streams.

6. The image processing system of claim 1, wherein the CNN is formed by a digital signal processor (DSP) executing software instructions.

7. The image processing system of claim 1, wherein the block matching hardware module comprises a semi-global block matching hardware module configured to implement a Lucas-Kanade method on the first and second image streams to provide the displacement stream.

8. A system comprising:
a system on a chip (SoC) including:
a plurality of processors;
a memory controller coupled to the plurality of processors;
onboard memory coupled to the memory controller;
an external memory interface for connecting to external memory;
a high-speed interconnect coupled to the plurality of processors, the memory controller and the external memory interface;
an external communication interface coupled to the high-speed interconnect; and
a block matching hardware module having an input for receiving first and second image streams and an output for providing a displacement stream for disparity prediction or for motion prediction; and
an external memory coupled to the external memory interface and storing instructions for execution on a first processor of the plurality of processors to form, when executed on the first processor, a convolutional neural network (CNN) having an input coupled to the block matching hardware module for receiving the displacement stream and for receiving at least one of the first and second image streams,
wherein the instructions are configured to be executable by the first processor for further causing the CNN to selectively provide a refined displacement stream.

9. The system of claim 8,
wherein the first and second image streams are left and right image streams and the displacement stream and refined displacement stream are each disparity streams, and
wherein the CNN receives both of the first and second image streams.

10. The system of claim 8,
wherein the first and second image streams are left and right image streams and the displacement stream and refined displacement stream are each disparity streams, and
wherein the CNN receives only one of the first and second image streams.

11. The system of claim 8,
wherein the first and second image streams are current and previous image streams and the displacement stream and refined displacement stream are each motion streams, and
wherein the CNN receives both of the first and second image streams.

12. The system of claim 8,
wherein the first and second image streams are current and previous image streams and the displacement stream and refined displacement stream are each motion streams, and
wherein the CNN receives only one of the first and second image streams.

13. The system of claim 8, wherein the block matching hardware module further provides a confidence stream, the SoC further comprising:
comparator logic coupled to the block matching hardware module and the CNN and receiving the confidence stream, the displacement stream and the refined displacement stream and providing the displacement stream if a value of the confidence stream is greater than a threshold value and providing the refined displacement stream if the value of the confidence stream is less than the threshold value.

14. The system of claim 8,
wherein the plurality of processors includes a digital signal processor (DSP), and
wherein the DSP is the first processor used to execute the instructions and form the CNN.

15. The system of claim 8, wherein the block matching hardware module comprises a semi-global block matching hardware module configured to implement a Lucas-Kanade method on the first and second image streams to provide the displacement stream.

16. A method of image processing comprising:
processing first and second image streams with a block matching hardware module to provide a displacement stream;
generating a confidence stream based on the first and second image streams;
processing the displacement stream, and at least one of the first and second image streams with a convolutional neural network (CNN) to selectively provide a refined displacement stream for disparity prediction or for motion prediction;
responsive to a value of the confidence stream being greater than a threshold value, bypassing the CNN and outputting the displacement stream; and
responsive to the value of the confidence stream being less than the threshold value, providing and outputting the refined displacement stream.

17. The image processing method of claim 16,
wherein the first and second image streams are left and right image streams and the displacement stream and refined displacement stream are each disparity streams, and
wherein the method further comprises receiving, by the CNN, both of the first and second image streams.

18. The image processing method of claim 16,
wherein the first and second image streams are left and right image streams and the displacement stream and refined displacement stream are each disparity streams, and
wherein the method further comprises receiving, by the CNN, only one of the first and second image streams.

19. The image processing method of claim 16,
wherein the first and second image streams are current and previous image streams and the displacement stream and refined displacement stream are each motion streams, and
wherein the method further comprises receiving, by the CNN, both of the first and second image streams.

20. The image processing method of claim 16,
wherein the first and second image streams are current and previous image streams and the displacement stream and refined displacement stream are each motion streams, and
wherein the method further comprises receiving, by the CNN, only one of the first and second image streams.

\* \* \* \* \*